United States Patent [19]

Ashkin et al.

[11] 4,453,805

[45] Jun. 12, 1984

[54] OPTICAL GRATING USING A LIQUID SUSPENSION OF DIELECTRIC PARTICLES

[75] Inventors: Arthur Ashkin, Rumson; Peter W. Smith, Colts Neck; Walter J. Tomlinson, III, Holmdel, all of N.J.

[73] Assignee: Bell Telephone Laboratories, Incorporated, Murray Hill, N.J.

[21] Appl. No.: 236,031

[22] Filed: Feb. 19, 1981

[51] Int. Cl.$^3$ .............................................. G02B 5/18
[52] U.S. Cl. .............................. 350/162.24; 350/162.2
[58] Field of Search ...................... 350/162.11, 162.16, 350/162.2, 162.24; 585/6.3

[56] References Cited

FOREIGN PATENT DOCUMENTS 1330089  9/1973  United Kingdom ........... 350/162.24

OTHER PUBLICATIONS

Arthur Ashkin, "Acceleration and Trapping of Particles ...", *Physical Review Letters*, vol. 24, No. 4, pp. 156–159 (Jan. 26, 1970).
A. Jay Palmer, "Nonlinear Optics in Aerosals", *Optics Letters*, vol. 5, No. 2, Feb. 1980, pp. 54–55.
"Selective Preview of U.S.A.", *Laser Focus*, Oct. 1980, pp. 12, 24, 26.
"Dow Uniform Latex Particles", *Dow Diagnostics*, pp. 1–4.
"What are Nalcoag Colloidal Silicas", *Nalcoag Colloidal Silicas*, Nalco. Chemical Co.
"Properties, Uses, Storage and Handling, LUDOX Colloidal Silica", Dupont Chemical Co., pp. 1–4.

*Primary Examiner*—Bruce Y. Arnold
*Assistant Examiner*—William Propp
*Attorney, Agent, or Firm*—Daniel D. Dubosky; Gregory C. Ranieri

[57] ABSTRACT

The invention provides apparatus comprising at least two beams of coherent radiation directed so as to intersect and form a standing wave pattern having a period $\Lambda$ in an optically responsive medium. The optically responsive medium is a colloidal suspension of dielectric particles in a liquid medium, the dielectric particles and liquid having different indices of refraction, and the diameter of the particles being less than or approximately equal to the period $\Lambda$. The dielectric particles are arranged into a grating by the electric fields carried by the beams of coherent radiation. In an embodiment of the invention, the dielectric particles are small dielectric spheres. The dielectric particles and the liquid may have approximately equal mass densities. A third beam of light may generate an output beam of light by degenerate four-wave mixing processes incorporating a dielectric grating made by the electric fields carried by the beams of coherent radiation.

6 Claims, 3 Drawing Figures

OPTICAL GRATING USING A LIQUID SUSPENSION OF DIELECTRIC PARTICLES

BACKGROUND OF THE INVENTION

This invention relates to a broadband low-power nonlinear optics medium and, more particularly, to a nonlinear optics medium that may be used to generate a strong optical grating.

It is now well known that substantial radiation pressure forces can be exerted on small transparent dielectric particles by a laser beam. See, for example, the articles by A. Ashkin entitled "Acceleration and Trapping of Particles by Radiation Pressure," *Physical Review Letters*, Vol. 24, No. 4, Jan. 26, 1970, pp. 156–159 and "Applications of Laser Radiation Pressure," *Science*, Vol. 210, page 1081, Dec. 5, 1980. In the Ashkin articles a focused beam from a laser is used to trap small transparent spheres. Recently it has been proposed to use an aerosol of dielectric spheres to achieve a nonlinear optical medium. See the article entitled "Nonlinear Optics In Aerosols," by A. Jay Palmer, *Optics Letters*, Vol 5, No. 2, February 1980, pp. 54–55. Experiments are described in the Palmer article wherein an aerosol of dielectric spheres is utilized to provide a medium having a degenerate third order nonlinear susceptibility of the type that is required in four-wave mixing experiments. The particles proposed by Palmer had diameters in the order of 5 micrometers and, therefore, it was said that these particles would be restricted to spatial gratings having periods greater than about 50 micrometers. One difficulty encountered by Palmer is the fact that the particles of the aerosol tended to settle out in the presence of earth's gravity. Two methods were proposed to overcome this difficulty. The first method involved the suspension of the aerosol in an upward-directed flow field of a viscous medium, more specifically, in the presence of an upward-directed flow of air. The second method Palmer proposed was the levitation of the aerosol particles by electrostatically charging the particles and applying a vertical DC electric field as in the Millikan oil drop experiment. Both methods were found to be essentially unsatisfactory and Palmer concluded that the use of an aerosol as a nonlinear optic medium is most easily accomplished in the absence of gravity.

SUMMARY OF THE INVENTION

A strong optical grating using an artifical nonlinear medium is achieved in accordance with the present invention by exposing a liquid colloidal suspension of substantially uniform dielectric particles to at least two intersecting beams of coherent radiation. The refractive index of the particles is chosen to be different than that of the liquid medium and the size of the particles is sufficiently small such that the particles remain in a colloidal suspension relatively unaffected by the forces of earth's gravity. In addition, the diameter of the particles is chosen to be less than or approximately equal to the period of the grating that is to be formed. If the particles have a higher refractive index than the surrounding liquid, radiation pressure forces the particles into the high-field regions of the resulting standing wave thereby increasing the refractive index in those regions. Particles of a lower refractive index than the medium are forced out of the standing wave maxima-again increasing the average refractive index in that region.

One medium that can be used to form a grating in accordance with the present invention is sold by the Dow Chemical Company as "Dow Uniform-Latex Particles" which consists of a water suspension of small dielectric spheres made from a latex. In the specific embodiment that was constructed, Dow Uniform Latex Particles having a diameter of 0.234 micrometers in a suspension of water were placed in a degenerate four-wave mixing apparatus using counter propogating pump beams and a probe beam generated from a argon laser having an output wavelength of 5145 angstroms. The measured effective optical Kerr coefficient for this medium was determined to be approximately $10^5$ times the value exhibited by carbon disulfide, a medium frequently used in four-wave mixing experiments.

BRIEF DESCRIPTION OF THE DRAWING

The invention will be more readily understood after reading the following detailed description wherein.

DETAILED DESCRIPTION

The forces on a dielectric sphere in the electric field of a light wave can be determined by considering the scattering from the sphere. It is known that a dielectric sphere in an electric field $\overline{E}$ behaves as a dipole with polarization $\overline{P}$ given by:

$$\overline{P} = n_b^2 \left( \frac{n^2 - 1}{n^2 + 2} \right) r^3 \overline{E} = \alpha \overline{E} \tag{1}$$

where $n_b$ is the refractive index of the surrounding medium, $n$ ($=n_a/n_b$) is the ratio of the refractive index of the sphere ($n_a$) to that of the surrounding medium, r is the radius of the sphere, and $\alpha$ is the polarizability of the sphere suspended in the liquid. In an electric field gradient, we have a force on the sphere, $F_{grad}$, given by:

$$F_{grad} = (\overline{P} \cdot \nabla)\overline{E} = \tfrac{1}{2}\alpha \nabla E^2 \tag{2}$$

Thus for a liquid suspension of spheres in a standing-wave light field, there is a force moving spheres whose index of refraction is greater than that of the medium into the high-field regions of the standing-wave pattern. As a result, the average refractive index in the high-field regions increases, and the medium manifests a positive optical Kerr coefficient ($n_2$). Similarly, a suspension of spheres having an index of refraction less than that of the medium will have the spheres pushed into the low-field regions—again creating an index change analogous to that in a medium with a positive $n_2$. These light forces are opposed by thermal diffusion (Brownian movement) of the spheres. Gravitational forces in liquids can be made negligible by choosing spheres sufficiently small such that they remain in a colloidal suspension. In order to approximate a uniform optical medium, it is necessary to have the size of the spheres and their average spacing less than or equal to the wavelength of the light.

Figure 1:
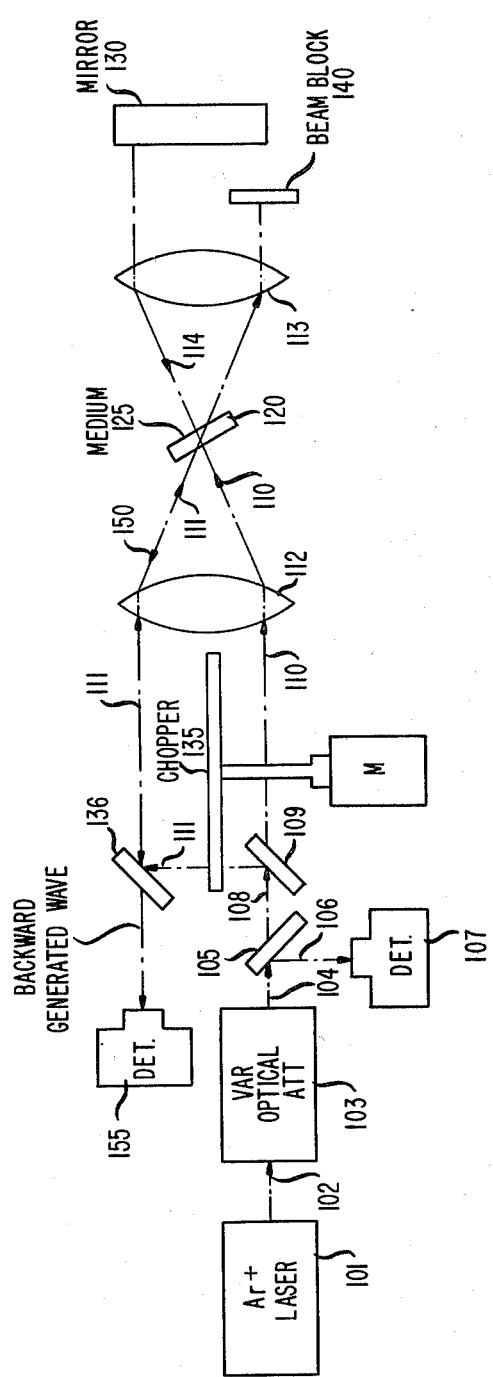
FIG. 1 is a block diagram of the apparatus used to develop an optical grating in accordance with the present invention.

A grating was constructed in accordance with the present invention by the apparatus illustrated in FIG. 1. In FIG. 1, an argon laser having an output wavelength of 5145 Angstroms had its output beam 102 coupled to the input of a variable optical attenuator 103. Attenuator 103 can be constructed using crossed polarizers in order to achieve an output beam 104 having a changeable optical intensity. Laser 101 should be chosen to have a coherence length that is greater than the maximum path difference to be encountered in the apparatus described hereinafter. It should be apparent to those skilled in the art that this may require an etalon within the laser cavity. An optical isolator may also be required in order to isolate the laser cavity from any reflections that are generated by the apparatus to follow.

Beam 104 at the output of the attenuator is coupled to a beam splitter 105 which provides a beam 108 and a beam 106 to the input of an optical detector 107. The power measured by this detector 107 will hereinafter be referred to as the input power. Beam 108 after emerging from beam splitter 105 is coupled to a beam splitter 109 which, in turn, provides a pump beam 110 and a beam 111 referred to hereinafter as the probe beam. Beam 110 is coupled through a microscope objective 112 having a magnification of five to direct the pump beam 110 into a glass container 120 which holds the nonlinear optics medium 125 consisting of a colloidal suspension of dielectric particles to be described hereinafter. The container 120 and the optics medium 125 are substantially transparent thereby permitting beam 110 to emerge from the sample and be redirected by a second microscope objective 113 toward a flat mirror 130. The beam reflected by mirror 130 is redirected by microscope objective 113 to develop a counter-propogating pump beam 114 within the nonlinear optics medium 125.

The probe beam 111 is coupled through the rotating disk of a chopper 135 onto a beam splitter 136 which redirects beam 111 onto a second area of the microscope objective 112. This probe beam 111 is redirected by microscope objective 112 so as to intersect with the pump beams 110 and 114 at a point within the nonlinear optics medium 125. After passing through this medium the probe beam is directed by microscope objective 113 so as to impinge on a beam block 140. Beam block 140, when present in the path of probe beam 111, substantially absorbs all of its energy and thereby prohibits any sizeable beam from being reflected and redirected by microscope objective 113 back into the sample 125. It is advantageous, however, to have a flat mirror 130 which is large enough such that beam block 140 can be removed in order to permit a total reflection of beam 111 during the initial alignment of the apparatus.

In the embodiment which was constructed, nonlinear optics medium 125 was made by diluting with deionized water a product available from the Dow Chemical Company, Indianapolis, Ind., called Dow Uniform Latex Particles. This product is a water suspension of extremely uniform small diameter latex spheres. In the present embodiment, the spheres had a diameter of 0.234 micrometers. The product is available with sphere diameters ranging from less than 0.1 micrometer to about 100 micrometers and normally used in latex fixation or latex agglutination tests and for the calibration of electron microscopes and particle or cell counting instruments.

The small latex spheres in the product available from the Dow Chemical Company have a mass density which is approximately equal to the mass density of the liquid medium, and for this reason the product is even less susceptible to the force of gravity than other colloidal suspensions. Although desirable, this is by no means a necessary criteria for the practice of the present invention especially where the particles in the liquid colloidal suspension are sufficiently small so that Brownian motion provides a significant contribution to the dispersion of the particles. Equally usable products where the mass densities are not equal are available from E. I. DuPont Nemours Company (Inc.) as LUDOX Colloidal Silica and from the Nalco Chemical Company as NALCOAG Colloidal Silicas.

Probe beam 111 was caused to intersect the pump beams 110 and 114 at an angle of about 6.4 degrees. As a result, standing wave patterns with periods of 3.5 micrometers and 0.19 micrometers were developed in the liquid suspension of dielectric particles. As described hereinabove, the standing wave pattern with a period of 3.5 micrometers causes the generation of a coarse grating within the medium having an equal period. This grating is formed because the small dielectric spheres tend to move to the points in the liquid that correspond to the points of peak light intensity thereby leaving a scarcity of spheres in the points of the pattern that correspond to nodes in the optical intensity. The backward wave generated by this grating is shown as beam 150 in FIG. 1 which beam is redirected by microscope objective 112 so as to be coupled through beam splitter 136 into a detector 155. This detector is used to determine the intensity of the power referred to hereinafter as output power.

Figure 2:
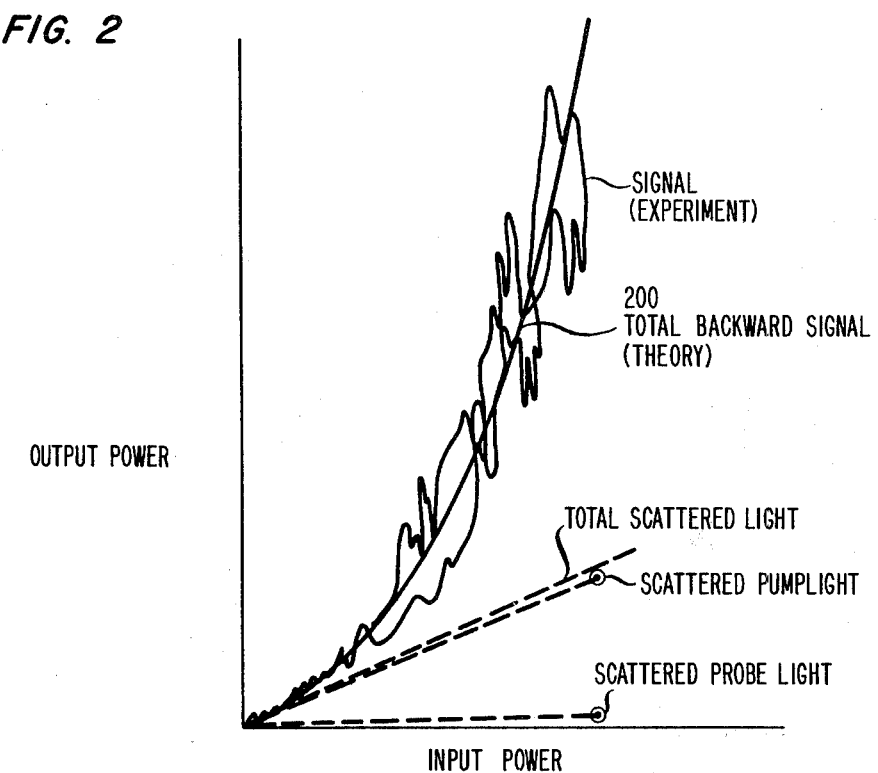
FIGS. 2 and 3 are graphs of the result achieved from the apparatus illustrated in FIG. 1.

FIG. 2 shows the observed behavior of the backward-generated wave as a function of input power. The maximum incident light power was approximately equal to 100 mW. Line 200 shows the expected cubic relationship between input and output power corrected for measured scattered background light. The average observed signal closely follows the expected behavior for degenerate four-wave mixing. The maximum reflectivity of the probe beam was 0.47 percent for a power of 50 mW in each pump beam. From a computation taking account of the Gaussian profile of the light beams, and assuming that only the coarse grating contributes to the backward wave (the diameter of the spheres is greater than the period of the standing wave pattern which would produce a fine grating) these figures indicate that the medium has an effective optical Kerr coefficient of:

$$n_2 = 3.6 \times 10^{-9} \, [\text{W/cm}^2]^{-1}. \tag{3}$$

Figure 3:
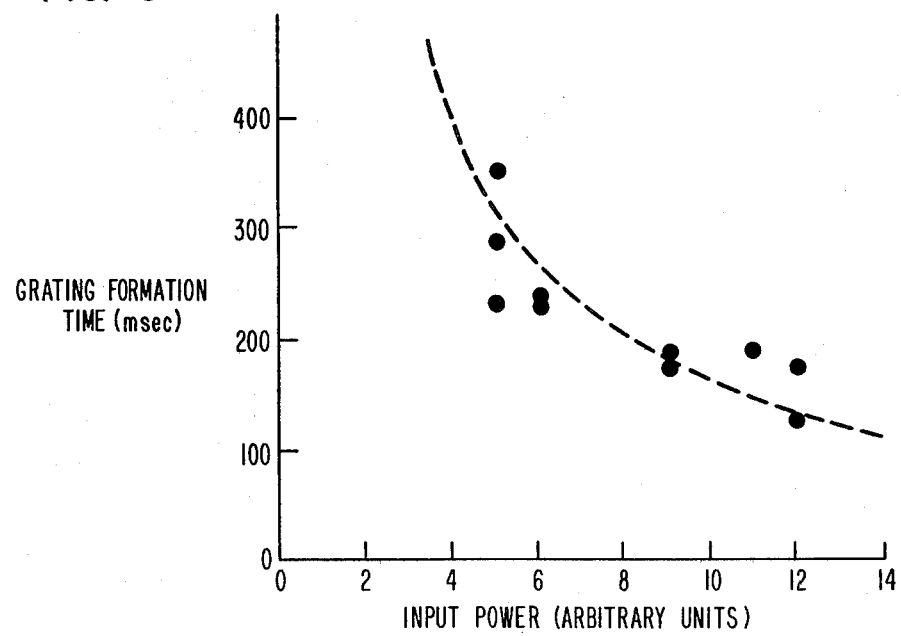

By chopping the probe beam as shown in FIG. 1, measurements could be made of the grating formation and decay times. The grating decay time was found to be 140±40 msec independent of the grating strength. The formation time depended on the input power as shown in FIG. 3. Note that at high powers the formation and decay times are roughly equal. We would expect this would signify the start of a saturation of the index change.

The strength of a saturated grating in such a medium can be computed from first principles. The measured scattering loss for our sample was 15 cm$^{-1}$. Assuming Rayleigh scattering we compute a density of suspended spheres of $N = 6.5 \times 10^{10}/\text{cm}^3$. For a fully saturated grating the density is doubled in the high-field regions and is zero in low-field regions. From the known refractive indexes for the liquid ($n_b = 1.33$) and the spheres ($n_a = 1.59$), we compute the average refractive index grating depth to be $\Delta n = 2.3 \times 10^{-4}$. Experimentally at maximum input we measure $\Delta n = 4.2 \times 10^{-4}$. This somewhat larger value probably indicates that some additional spheres are drawn into the interaction region by the relatively weaker transverse intensity gradients due to the Gaussian transverse beam structure.

The characteristic grating formation and decay times can also be computed from first principles. The spheres under the influence of light forces ($F_{grad}$) move with a limiting velocity, v, given by Stoke's law:

$$v = \frac{F_{grad}}{6\pi r \eta} \quad (4)$$

where $\eta$ is the viscosity of the liquid. The formation time, $\tau_F$, is then approximately the time for a sphere to move one quarter of the grating period, $\Lambda$, i.e., $$\tau_F = \Lambda/4v \quad (5)$$

where the velocity, v, is found from Equations 2 and 4. This time is inversely proportional to the input power. From Equations 2 and 4 we compute $\tau_F = 320$ msec at 100 mW, the maximum input power used for these experiments. This functional dependence and absolute value roughly agree with the experimental measurements shown in FIG. 3.

The grating decay time is governed by Brownian diffusion. The time to diffuse $\Lambda/4$ is given by:

$$\tau_D = \frac{3\pi r^2 \eta \Lambda^2}{16kT} \quad (6)$$

where k is Boltzman's constant and T is the absolute temperature. For our experimental conditions Equation 6 gives $\tau_D = 200$ msec. This is in reasonably good agreement with the measured grating decay time of $140 \pm 40$ msec.

What is claimed is:

1. Apparatus comprising an optically responsive medium and means for generating at least two beams of coherent radiation, said beams directed so as to intersect and form a standing wave pattern having a period $\Lambda$ in said optically responsive medium characterized in that said optically responsive medium is a colloidal suspension of dielectric particles in a liquid medium, said dielectric particles and said liquid medium having different indexes of refraction, the diameter of said particles being less than or approximately equal to said period $\Lambda$, said dielectric particles being responsive to said standing wave pattern so that said dielectric particles are arranged substantially into a grating by said at least two beams of coherent radiation.

2. Apparatus as defined in claim 1 wherein said dielectric particles are small dielectric spheres.

3. Apparatus as defined in claim 2 wherein said dielectric spheres and said liquid have approximately equal mass densities.

4. Apparatus comprising an optically responsive medium and a degenerate four-wave mixing means wherein counter propagating pump beams and a probe beam are oriented so as to intersect in said optically responsive medium, said optically responsive medium comprising a colloidal suspension of substantially uniform dielectric particles in a liquid medium, said dielectric particles and said liquid having different indeces of refraction, the diameter of said dielectric particles being approximately equal to or less than the period of a standing wave pattern formed by said probe beam and one of said counter propagating pump beams, so that an output beam is generated by interaction of said counter propagating pump beams, said probe beam, and said dielectric particles.

5. Apparatus as defined in claim 4 wherein said dielectric particles are small dielectric spheres.

6. Apparatus as defined in claim 5 wherein said dielectric spheres and said liquid have approximately equal mass densities.

* * * * *